(12) United States Patent
Senoo et al.

(10) Patent No.: US 7,036,876 B2
(45) Date of Patent: May 2, 2006

(54) ROOF LINING EXTREMITY FIXING STRUCTURE

(75) Inventors: Katsuhiro Senoo, Wako (JP); Takatomo Watanabe, Haga-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 1 day.

(21) Appl. No.: 10/888,809

(22) Filed: Jul. 7, 2004

(65) Prior Publication Data
US 2005/0006929 A1    Jan. 13, 2005

(30) Foreign Application Priority Data
Jul. 11, 2003    (JP) .............................. 2003-273682

(51) Int. Cl.
B60R 13/02    (2006.01)
(52) U.S. Cl. .................................... 296/214
(58) Field of Classification Search ............. 296/214
See application file for complete search history.

(56) References Cited

U.S. PATENT DOCUMENTS 4,923,245 A * 5/1990 Kuwabara .................. 296/214
5,108,147 A * 4/1992 Grimm et al. .............. 296/214
6,343,831 B1 * 2/2002 Nabert et al. .......... 296/187.05

FOREIGN PATENT DOCUMENTS

JP    2558652    9/1997

* cited by examiner

Primary Examiner—Dennis H. Pedder
(74) Attorney, Agent, or Firm—Hamre, Schumann, Mueller & Larson, P.C.

(57) ABSTRACT

A roof lining extremity fixing structure for fixing an end portion of a roof lining 28 provided on a passenger compartment side of a sunroof unit 16 to an opening-side edge portion 25 of a stationary part 17 of the sunroof unit 16 via a fixing member 30, the roof lining extremity fixing structure being characterized in that an engagement portion 33 which is brought into resilient engagement with the opening-side edge portion 25 of the stationary part 17 and an extended portion 34 which is disposed at an interval on a side to which the engagement portion 33 resiliently deforms at the time of engagement are formed on the fixing member 30, so that an extremity portion 51 of a skin 47 of the roof lining 28 is fixedly held by the engagement portion 33 and the extended portion 34.

4 Claims, 4 Drawing Sheets

ROOF LINING EXTREMITY FIXING STRUCTURE

BACKGROUND OF THE INVENTION

The present invention relates to a roof lining extremity fixing structure for a vehicle provided with a sunroof.

As a structure associated with a roof lining extremity fixing structure for a vehicle provided with a sunroof, there exists a structure in which a plate spring is provided on a frame along an opening-side edge portion of a roof, and a plurality of engagement portions are formed on the plate spring in such a manner as to be biased toward an opening in the roof, whereby these engagement portions are caused to fit in an extremity of a roof lining by virtue of the biasing force of the plate spring (for example, refer to Japanese Utility Model Registration No. 2558652). In this structure, an extremity portion of a skin of the roof lining is turned around to a back side of a base material of the roof lining, and the plurality of engagement portions on the plate spring are passed through holes formed in the skin individually so as to fit in holes in the base material thereafter. Namely, since the extremity portion of the skin of the roof lining is possible to come apart when it is bonded using an adhesive only, an exposure of the extremity portion of the skin to the passenger compartment side due to curling is prevented by passing the plurality of engagement portion through the holes in the extremity portion of the skin.

In the aforesaid structure, while the exposure of the extremity portion of the skin of the roof lining to the passenger compartment side is prevented, the plurality of engagement portions on the plate spring need to be fitted in the holes formed in the skin and the holes in the base material, leading to a problem that the structure is made complicated and hence the production costs are increased.

SUMMARY OF THE INVENTION

Consequently, an object of the invention is to provide a roof lining extremity fixing structure which can reduce costs involved.

With a view to attaining the object, according to a first aspect of the invention, there is provided a roof lining extremity fixing structure for fixing an end portion of a roof lining (for example, a roof lining 28 in an embodiment) provided on a passenger compartment side of a sunroof unit (for example, a sunroof unit 16 in the embodiment) to an opening-side edge portion (for example, an opening-side edge portion 25 in the embodiment) of a stationary part (for example, a guide rail 17 in the embodiment) of the sunroof unit via a fixing member (for example, a reinforcement member 30 in the embodiment), the roof lining extremity fixing structure being characterized in that an engagement portion (for example, an engagement portion 33 in the embodiment) which is brought into resilient engagement with the opening-side edge portion of the stationary part and an extended portion (for example, an extended portion 47 in the embodiment) which is disposed at an interval on a side to which the engagement portion resiliently deforms at the time of engagement are formed on the fixing member, so that an extremity portion (for example, an extremity portion 51 in the embodiment) of a skin (for example, a skin 47 in the embodiment) of the roof lining is fixedly held by the engagement portion and the extended portion.

According to a second aspect of the invention, there is provided a roof lining extremity fixing structure as set forth in the first aspect of the invention, wherein the engagement portion of the fixing member abuts with the opening-side edge portion of the stationary part from above, and wherein the fixing member has a raised portion (for example, a raised portion 32 in the embodiment) which protrudes upwardly to abut with the stationary part from below.

According to the first aspect of the invention, when the engagement portion of the fixing member is brought into engagement with the opening-side edge portion of the stationary part of the sunroof unit with the extremity portion of the skin of the roof lining being fixedly held by the engagement portion and the extended portion of the fixing member, the engagement portion deforms resiliently so as to reduce the distance to the extended portion disposed on the side to which the engagement portion deforms resiliently, and as a result, the extremity portion of the skin of the roof lining is held by the engagement portion and the extended portion in an ensured fashion. This can prevent the curling of the extremity portion of the skin and hence can prevent the exposure of the extremity portion of the skin to the passenger compartment side. Thus, since the exposure of the extremity portion of the skin to the passenger compartment due to the curling thereof is prevented by holding the extremity portion of the skin by the engagement portion and the extended portion and, moreover, by enhancing the holding force by making use of the resilient deformation of the engagement portion that occurs when the roof lining is attached to the sunroof unit, the structure can be made simpler and hence the production costs can be lowered.

According to the second aspect of the invention, since the fixing member abuts at the engagement portion thereof with the opening-side edge portion of the stationary part of the sunroof unit from above and abuts at the raised portion thereof which protrudes upwardly with the stationary part of the sunroof unit from below at the time of engagement, a vertical looseness of the fixing member can be eliminated. Consequently, the roof lining can be fixed to the stationary part of the sunroof unit via the fixing member in an ensured fashion.

DETAILED DESCRIPTION OF THE PREFERRED EMBODIMENTS

An embodiment representing a best mode for carrying out the invention will be described below by reference to the accompanying drawings.

Figure 1:
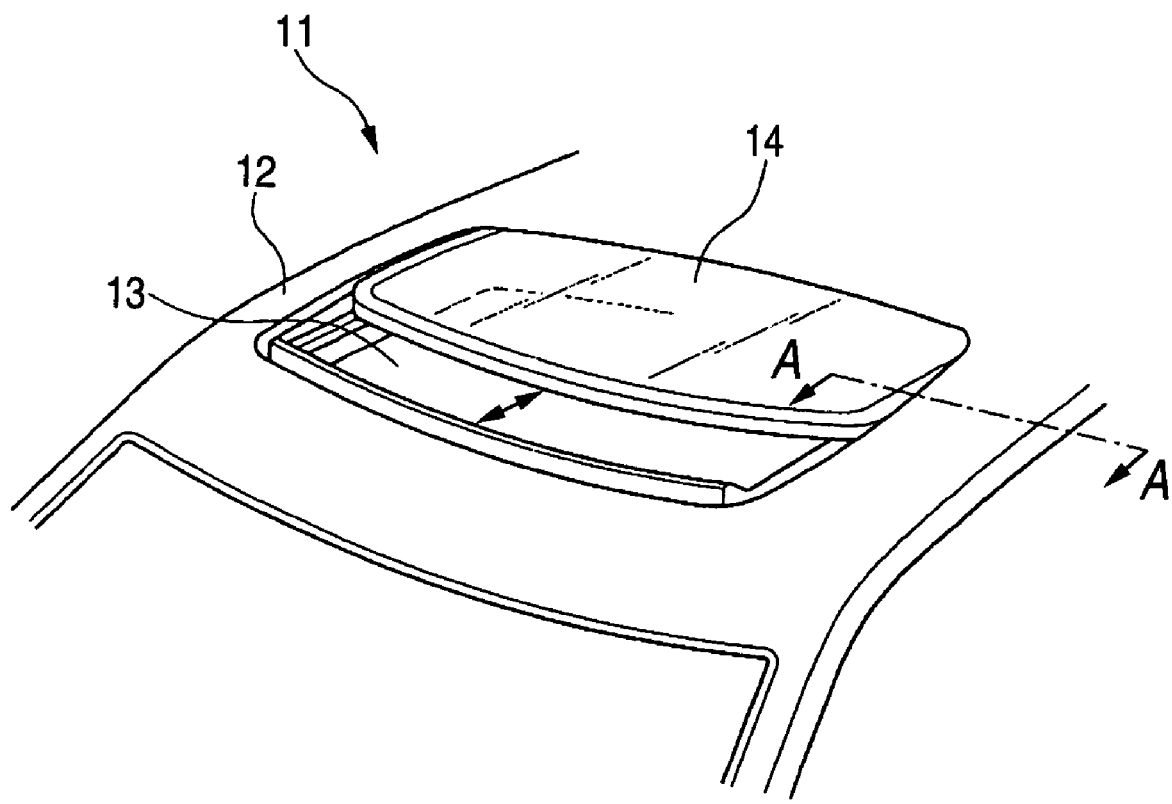
FIG. 1 is a perspective view illustrating a roof part of a vehicle to which an embodiment of the invention is applied.

FIG. 1 shows a roof part 11 of a vehicle, and a transversely elongated and substantially rectangular opening 13 is formed in a stationary panel 12 which constitutes an outside portion of the roof part 11, and a movable sunroof panel 14 is provided so that open and close the opening 13 so formed.

Figure 2:
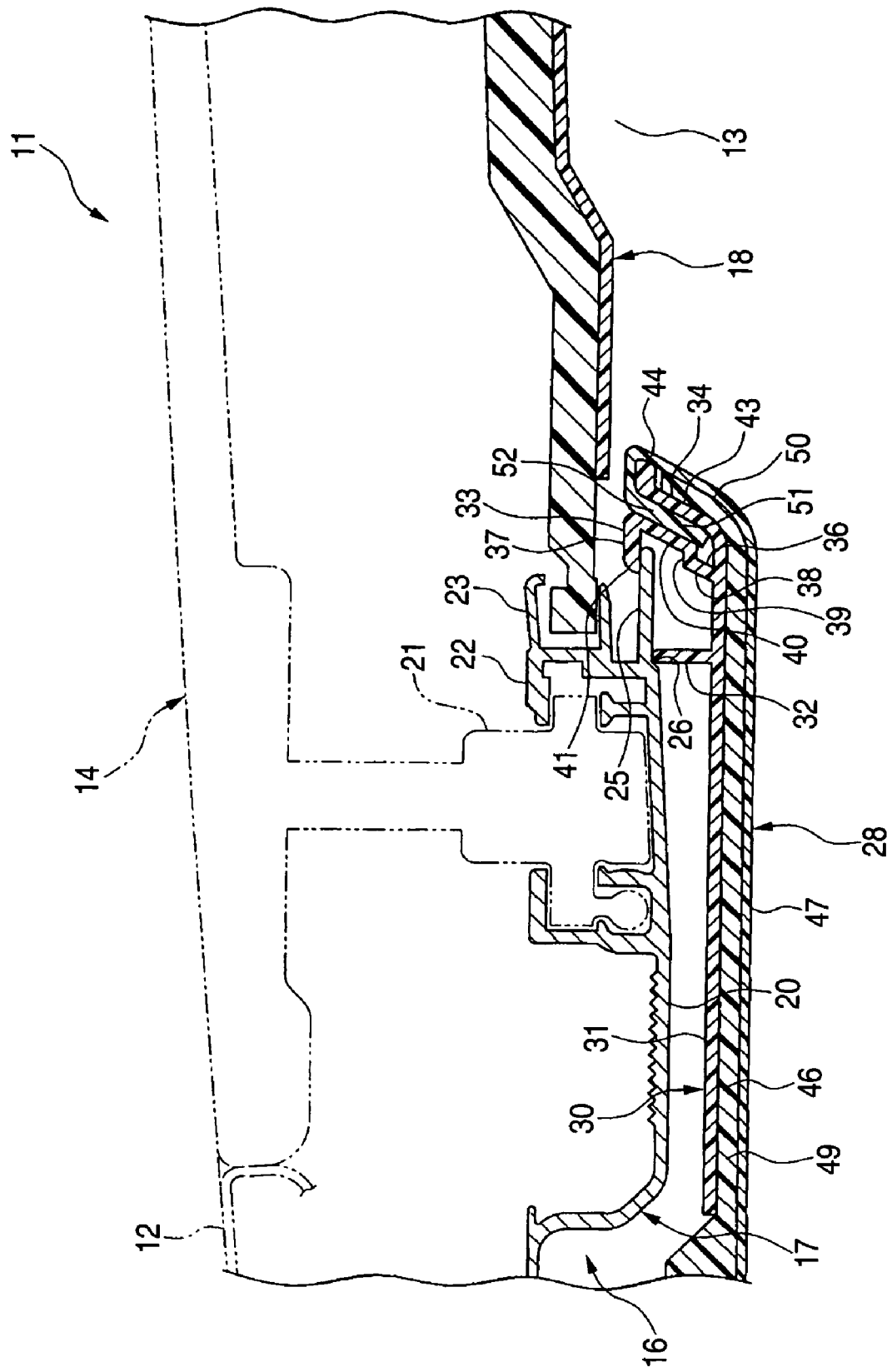
FIG. 2 is a sectional-view taken along the line A—A in FIG. 1 and viewed in a direction indicated by arrows shown therein, which shows the embodiment of the invention.

FIG. 2 is a sectional-view taken along the line A—A in FIG. 1 and viewed in a direction indicated by arrows shown therein. As shown in FIG. 2, a sunroof unit 16 including the sunroof panel 14 is provided on a passenger compartment side of the stationary panel 12.

The sunroof unit 16 has a guide rail 17 which is a stationary part for supporting the sunroof panel 14, the sunroof panel 14 supported by the guide rail 17 in such a manner as to be allowed to slide in a longitudinal direction of a vehicle body and a sunshade 18 supported by the guide rail 17 in such a manner as to be allowed to slide in the longitudinal direction of the vehicle body below the sunroof 14 or on a passenger compartment side.

The guide rail 17 is a metallic solid molded product of aluminum and is disposed on a side of a vehicle transverse direction of the opening 13 that is opened and closed by the sunroof panel 14 (a left side of the opening 13 shown as an example in FIG. 1). The guide rail 17 is formed into a shape having a main plate portion 20 which extends substantially horizontally, a sunroof supporting portion 22 formed on a side of the main plate portion 20 which faces the opening 13 for supporting a sliding portion 21 provided on a side of a vehicle transverse direction of the sunroof panel 14 in such a manner as to be allowed to slide and a sunshade supporting portion 23 formed on a side of the sunroof supporting portion 22 which faces opening 13 for supporting a side of a vehicle transverse direction of the sunshade 18 in such a manner as to be allowed to slide.

In addition, an opening-side edge portion 25 is formed below the sunshade supporting portion 23 of the guide rail 17 which protrudes substantially horizontally from the main plate portion 20 toward the opening 13 and extends in the longitudinal direction of the vehicle body. This opening-side edge portion 25 is formed in such a manner as to be offset slightly upwardly relative to the main plate portion 20, and as a result, a stepped portion 26 is formed on a lower side of a portion between the opening-side edge portion 25 and the main plate portion 20.

Figure 3:
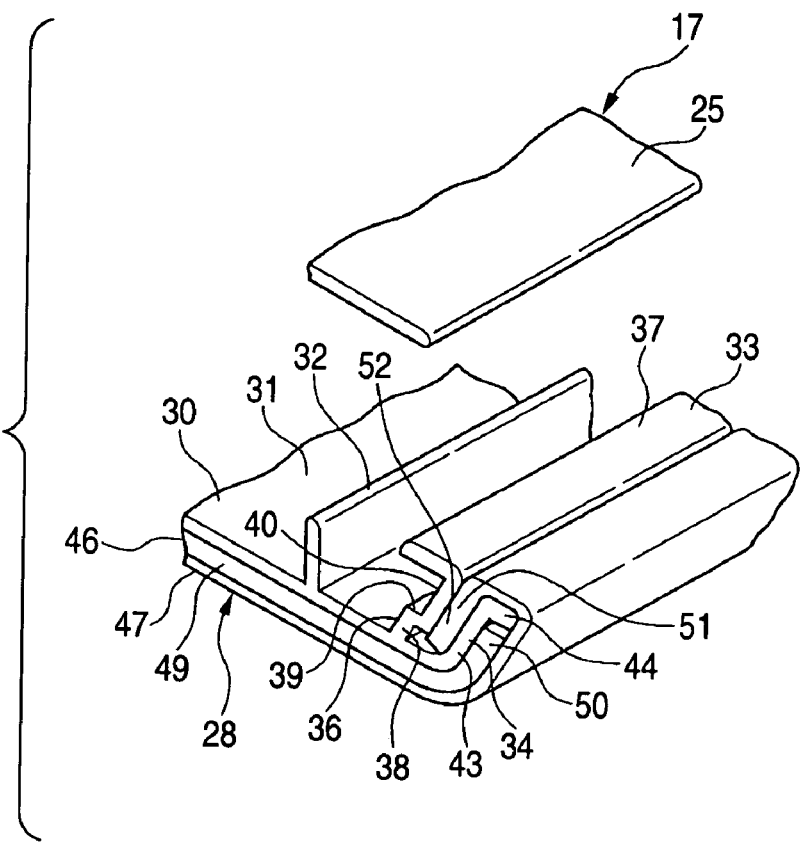
FIG. 3 is an exploded perspective view illustrating the embodiment of the invention.

Then, a roof lining 28 shown in FIGS. 2 and 3 is provided on a passenger compartment or lower side of the sunroof unit 16. This roof lining 28 is attached to an inner surface side of the roof part 11 at an intermediate portion thereof with a surface fastener, which is not shown, and an end portion of the roof lining 28 which faces the opening 13 is fixed to the opening-side edge portion 25 of the guide rail 17 which is a stationary part of the sunroof unit 16 via a reinforcement member (a fixing member) 30 provided on an upper side relative to the roof lining 28.

The reinforcement member 30 is a solid molded product from a resin by an extrusion or injection molding and has a base plate portion 31 which is formed into a flat plate and is disposed substantially horizontally, a raised portion 32 which protrudes upwardly from a side of the base plate portion 31 which faces the opening 13, an engagement portion 33 which protrudes upwardly from a position on the base plate portion 31 which is located nearer to the opening 13 than the raised portion 32 and an extended portion 34 which protrudes upwardly at a position on the base plate portion 31 which is located nearer to the opening 13 than the engagement portion 33 with a space being provided relative to the engagement portion 33.

The raised portion 32 is formed into a shape which erects substantially vertically from the base plate portion 31 and extends in the longitudinal direction of the vehicle body.

The engagement portion 33 is also formed into a shape which extends in the longitudinal direction of the vehicle body and has a root portion 36 which erects from the base plate portion 31 while inclining in such a manner as to be positioned nearer to the opening 13 as it extends upwardly and an engagement plate portion 37 which protrudes substantially horizontally from an end portion of the root portion 36 in an opposite direction to the opening 13. Here, the root portion 36 is formed into a stepped shape having a first plate portion 38 which erects slightly from the base plate portion 31 while inclining in such a manner as to be positioned nearer to the opening as it extends upwardly, a second plate portion 39 which slightly protrudes substantially horizontally from an upper end portion of the first plate portion 38 toward the opening 13 and a third plate portion 40 which erects from a side of the second plate portion 39 which faces the opening 13 while inclining in such a manner as to be positioned nearer to the opening as it extends upwardly, and the engagement plate portion 37 protrudes from an upper end portion of the third plate portion 40. Note that a portion which is chamfered in a curved fashion is formed at an upper corner portion of the engagement plate portion 37 which is situated opposite to the opening 13.

The extended portion 34 is also formed into a shape which extends in the longitudinal direction of the vehicle body and has a first plate portion 43 which erects from the base plate portion 31 while inclining in such a manner as to be positioned nearer to the opening 13 as it extends upwardly, so that the first plate portion 43 becomes parallel with the third plate portion 40 of the root portion 36 and a second plate portion 44 which slightly protrudes substantially horizontally from an upper end portion of the first plate portion 43 toward the opening 13.

The roof lining 28 has a base material 46 made up of a solid product molded from a resin and a skin 47 affixed to a passenger compartment or lower side of the base material 46. The base material 46 has a base plate portion 49 which is formed substantially into a flat plate-like shape and is disposed substantially horizontally and a distal end plate portion 50 which erects from a side of the base plate portion 49 which faces the opening 13 while inclining in such a manner as to be positioned nearer to the opening 13 as it extends upwardly. The skin 47 is affixed to the passenger compartment or lower side of the base material 46 and an extremity portion 51 of the skin 47 which faces the opening 13 is extended outwardly farther than the distal end plate portion 50 of the base material 46 by a predetermined length.

Here, the roof lining 28 is affixed to the reinforcement member 30 with an adhesive in a state in which the base plate portion 49 of the base material 46 is brought into full contact with a passenger compartment or lower side of the base plate portion 31 of the reinforcement member 30 and the distal end plate portion 50 of the base material 46 is brought into full contact with the first plate portion 43 of the extended portion 34. Then, the extremity portion 51 of the skin 47 which extends outwardly from the base material 46 is turned around to an upper side of the extended portion 34 and is thereafter inserted into a gap 52 between the third plate portion 40 of the root portion 36 of the engagement portion 33 of the reinforcement member 30, and as a result, the extremity portion 51 is fixedly held by the third plate portion 40 of the engagement portion 33 and the first plate portion 43 of the extended portion 34.

While the roof lining 28 is attached to the opening-side edge portion 25 of the guide rail 17 via the reinforcement member 30 that is affixed as is described above, the reinforcement member 30 is supported on the opening-side edge portion 25 by bringing the raised portion 32 into abutment with a proximal side of the opening-side edge portion 25 of the guide rail or the vicinity of the stepped portion 26 from below and bringing the engagement plate portion 37 of the engagement portion 33 into abutment with a distal side of the opening-side edge portion 25 from above. As this occurs, an interval between the raised portion 32 and the engagement plate portion 37 of the engagement portion 33 is made narrower than a vertical thickness of the opening-side edge portion 25 of the guide rail 17, and as a result, while resiliently deforming the engagement portion 33 toward the opening 13 side or the extended portion 34 side, the resin reinforcement member 30 comes into engagement with the opening-side edge portion 25 by virtue of a resilient force produced then (or resiliently engages with the opening-side edge portion 25). As a result, the engagement portion 33 resiliently deforms to reduce the distance to the extended portion 34 which is disposed at the interval on the side to which the engagement portion 33 deforms, whereby the holding force of the extremity portion 51 of the skin 47 of the roof lining 28 by the engagement portion 33 and the extended portion 34 is enhanced, thereby ensuring the holding of the extremity portion 51 of the skin 47 of the roof lining 28.

Note that the reinforcement member 30 may be disposed continuously or intermittently along the longitudinal direction of the vehicle body.

According to the embodiment that is described heretofore, when the engagement portion 33 of the reinforcement member 30 is brought into engagement with the opening-side edge portion 25 of the guide rail 17 of the sunroof unit 16 with the extremity portion 51 of the skin 47 of the roof lining 28 being fixedly held by the engagement portion 33 and the extended portion 34 of the reinforcement member 30, the engagement portion 33 deforms resiliently so as to reduce the distance to the extended portion 34 disposed on the side to which the engagement portion 33 deforms resiliently, and as a result, the extremity portion 51 of the skin 47 of the roof lining 28 is held by the engagement portion 33 and the extended portion 34 in an ensured fashion. This can prevent the curling of the extremity portion 51 of the skin 47 and hence can prevent the exposure of the extremity portion 51 of the skin 47 to the passenger compartment side. Thus, since the exposure of the extremity portion 51 of the skin 47 to the passenger compartment due to the curling thereof is prevented by holding the extremity portion 51 of the skin 47 by the engagement portion 33 and the extended portion 34 and, moreover, by enhancing the holding force by making use of the resilient deformation of the engagement portion 33 that occurs when the roof lining 28 is attached to the sunroof unit 16, the structure can be made simpler and hence the production costs can be lowered.

In addition, since the reinforcement member 30 abuts at the engagement portion 33 thereof with the opening-side edge portion 25 of the guide rail 17 of the sunroof unit 16 from above and abuts at the raised portion 32 thereof which protrudes upwardly with the opening-side edge portion 25 of the guide rail 17 of the sunroof unit 16 from below at the time of engagement, a vertical looseness of the reinforcement member 30 can be eliminated. Consequently, the roof lining 28 can be fixed to the guide rail 17 of the sunroof unit 16 via the reinforcement member 30 in an ensured fashion. As a result, since the gap between the roof lining 28 and the sunshade 18 can be maintained constant, the external appearance can be improved, thereby making it possible to impart the occupants an image of accurate fitting.

In addition, since the engagement portion 33 on the side of the reinforcement member 30 which faces the opening 13 is allowed to extend the edge of the roof lining 28 which faces the opening 13, the edge of the roof lining 28 which faces the opening 13 can be reinforced in an ensured fashion, thereby making it possible to keep the shape thereof stable.

Furthermore, since the fixing and prevention of looseness of the roof lining 28 on the side thereof which faces the opening 13 and fixing of the extremity portion 51 of the skin 47 can be effected solely by the reinforcement member 30, the number of components and man-hours can be reduced. In addition, since the reinforcement member 30 can be produced using an extrusion or injection molding, the production costs of the reinforcement member 30 can also be reduced.

Note that, in the embodiment, the extremity portion 51 of the skin 47 may be bonded to the engagement portion 33 and the extended portion 34 with an adhesive in order to ensure further the fixation of the extremity portion 51 of the skin 47 of the roof lining 28.

Figure 4:
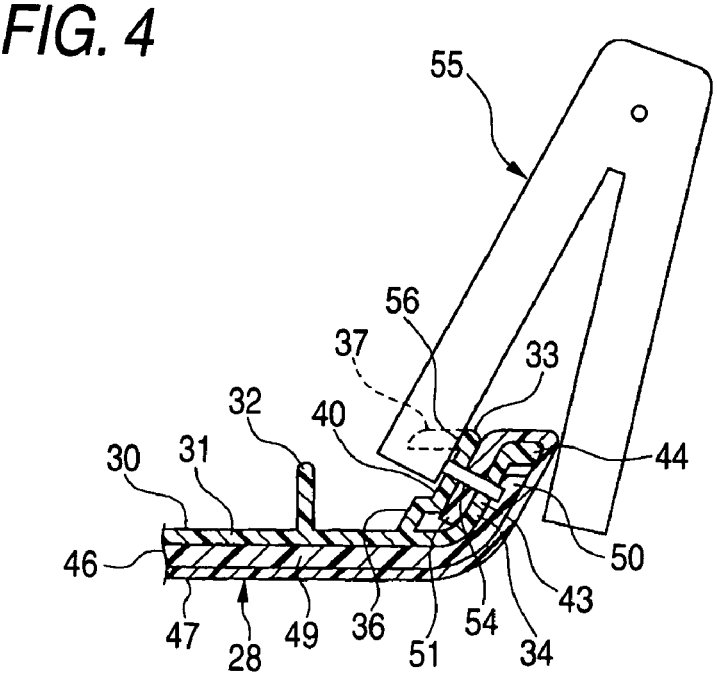
FIG. 4 is a sectional view taken along the line B—B in FIG. 5 which shows a modified example of a roof lining in the embodiment of the invention.
Figure 5:
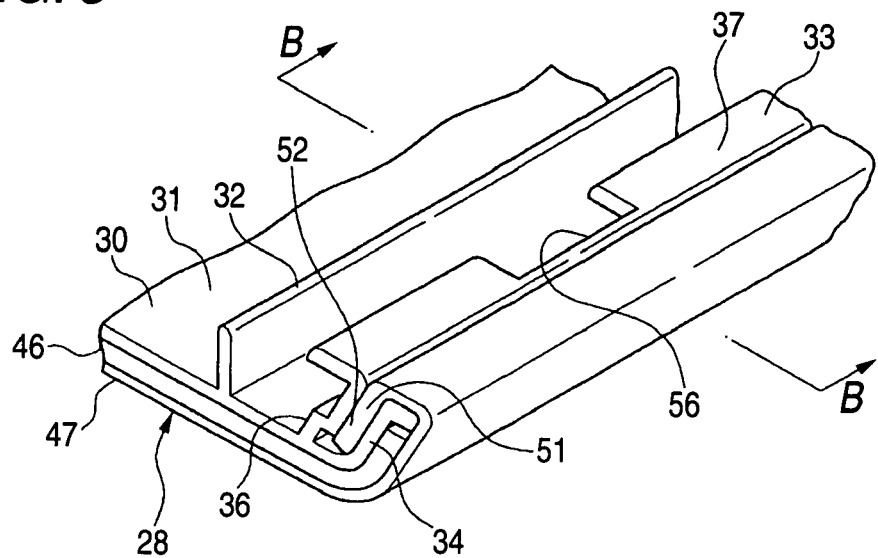
FIG. 5 is a perspective view illustrating the modified example to the roof lining in the embodiment of the invention.
Figure 6:
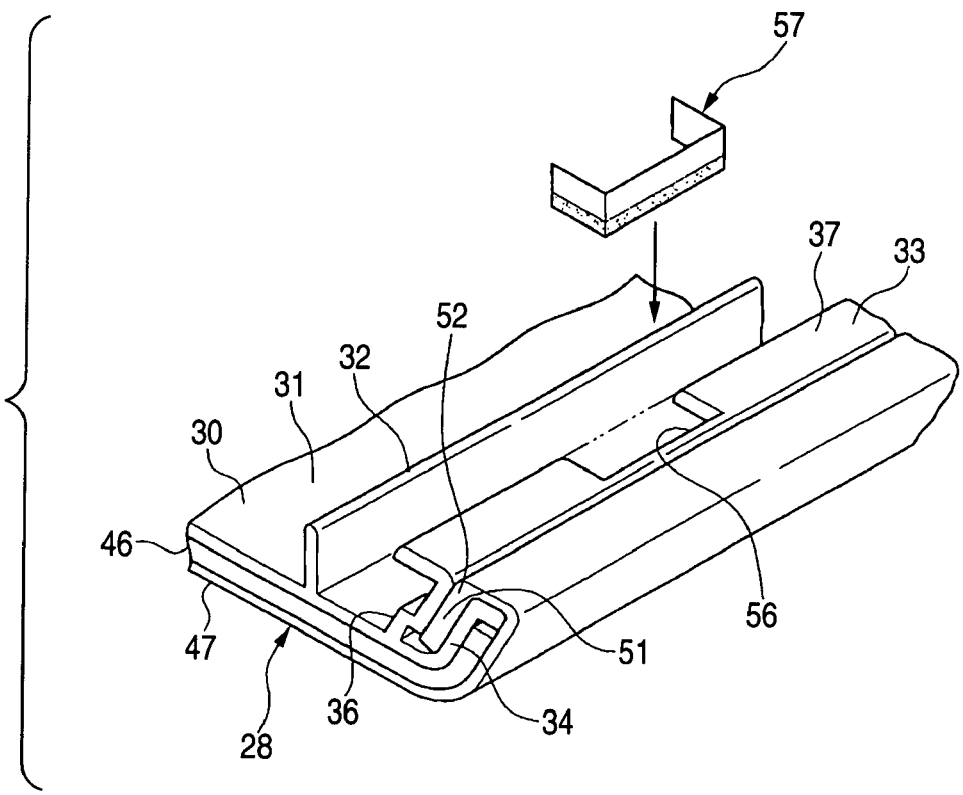
FIG. 6 is a perspective view illustrating the modified example to the roof lining in the embodiment of the invention and a cutting tool for forming a cut-away portion.

Furthermore, as shown in FIG. 4, the third plate portion 40 of the root portion 36 of the engagement portion 33, the extremity portion 51, the first plate portion 43 of the extended portion 34 and the base material 46 may be fixed together by a needle member 54 that is driven thereinto. As this occurs, it is recommendable to drive the needle member 54 from a root portion 36 side into the base material 46 halfway by a needle driver 55. Note that, in this case, as shown in FIG. 5, a cut-away portion 56 is formed in the engagement plate portion 37 so as to allow for the access of the needle driver 55 to the required location. The cut-away portion 56 is formed by cutting the engagement plate portion 37 with, for example, a cutting tool 57 shown in FIG. 6.

In addition to a side of a vehicle transverse direction of the opening 13, the structure that is described heretofore can be applied to the other transverse side of the opening 13, which is opposite to the side illustrated in the embodiment, as well as to a front longitudinal side of the opening 13.

What is claimed is:

1. A roof lining extremity fixing structure comprising:
   a roof lining;
   an opening-side edge portion;
   a fixing member,
   wherein an end portion of the roof lining provided on a passenger compartment side of a sunroof unit is fixed to the opening-side edge portion of a stationary part of the sunroof unit via the fixing member, and
   the fixing member includes:
      an engagement portion for which is brought into resilient engagement with the opening-side edge portion of the stationary part, and
      an extended portion which is disposed at an interval on a side to which the engagement portion resiliently deforms at the time of engagement, and
      an extremity portion of a skin of the roof lining which extends around an end of the extended portion of the fixing member and is fixedly held by the engagement portion and the extended portion.

2. The roof lining extremity fixing structure as set forth in claim 1, wherein
   the engagement portion of the fixing member abuts with the opening-side edge portion of the stationary part from above.

3. The roof lining extremity fixing structure as set forth in claim 1, further comprising:
   a raised portion which protrudes upwardly to abut with the stationary part from below provided on the fixing member.

4. The roof lining extremity fixing structure as set forth in claim 1, further comprising:
   a needle member for fixing the engagement portion, the extremity portion and the extended portion.

* * * * *